United States Patent
Gunton (10) Patent No.: US 7,633,253 B2
(45) Date of Patent: Dec. 15, 2009

(54) CONTROL AND MONITORING ARRANGEMENTS FOR AN APERTURE CLOSURE MEMBER

(76) Inventor: Bruce Stanley Gunton, 3 Gisborne Close, Yoxall, Staffordshire DE13 8NU (GB)

( * ) Notice: Subject to any disclaimer, the term of this patent is extended or adjusted under 35 U.S.C. 154(b) by 596 days.

(21) Appl. No.: 10/549,989

(22) PCT Filed: Mar. 19, 2004

(86) PCT No.: PCT/GB2004/001216
§ 371 (c)(1),
(2), (4) Date: Nov. 7, 2005

(87) PCT Pub. No.: WO2004/084397
PCT Pub. Date: Sep. 30, 2004

(65) Prior Publication Data
US 2007/0035264 A1    Feb. 15, 2007

(30) Foreign Application Priority Data
Mar. 20, 2003   (GB) ................................. 0306390.6

(51) Int. Cl.
*H02P 1/04*   (2006.01)
*G05D 3/00*   (2006.01)
(52) U.S. Cl. ....................... 318/466; 318/282; 318/468
(58) Field of Classification Search ............... 318/466, 318/282, 468
See application file for complete search history.

(56) References Cited

U.S. PATENT DOCUMENTS

| 4,338,553 A |   | 7/1982 | Scott, Jr. |
|---|---|---|---|
| 4,713,591 A | * | 12/1987 | McCloskey ................. 318/257 |
| 5,132,602 A |   | 7/1992 | Jorgensen et al. |
| 6,107,765 A |   | 8/2000 | Fitzgibbon et al. |
| 2002/0101210 A1 | * | 8/2002 | Boisvert et al. ............. 318/469 |

FOREIGN PATENT DOCUMENTS

| GB | 2117538 | 10/1983 |
|---|---|---|
| GB | 2186392 | 8/1987 |
| GB | 2271863 | 4/1994 |

OTHER PUBLICATIONS

Patent Abstracts of Japan, Publication No. 01064581, Published Mar. 10, 1989.

* cited by examiner

*Primary Examiner*—Bentsu Ro
*Assistant Examiner*—Erick Glass
(74) *Attorney, Agent, or Firm*—Chernoff, Vilhauer, McClung & Stenzel, LLP (57) ABSTRACT

Current through a motor is sensed to create a voltage which is amplified. The amplifier is followed by a high pass filter and a low pass filter. This recovers commutator pulses from the motor current, rejecting mains ripple and higher frequency noise. Commutator pulses are counted. Other arrangements could be used for injecting pulses into the motor supply, for counting at a remote position. Various techniques are described for controlling the motor in accordance with the result of counting.

18 Claims, 4 Drawing Sheets

CONTROL AND MONITORING ARRANGEMENTS FOR AN APERTURE CLOSURE MEMBER

This is a national stage application filed under 35 USC 371 based on International Application No. PCT/GB2004/001216 filed Mar. 19, 2004, and claims priority under 35 USC 119 of United Kingdom Patent Application No. 0306390.6 filed Mar. 20, 2003.

The present invention relates to control and monitoring arrangements.

DC motors are commonly used to drive items such as aperture closure members. It may be necessary to control and monitor the position of the aperture closure member for safety or other reasons. For example, when the aperture closure member is a sliding door, roller shutter door or the like, it may be necessary to monitor the member while it is closing, in order to detect the presence of an obstruction, and take appropriate remedial action, such as stopping or reopening the door.

The present invention provides a DC motor current monitoring arrangement, comprising:

current sensing means operable to create a waveform signal representing the waveform of the motor current;

filter means for the waveform signal and providing a high pass filter function and a low pass filter function, the high pass function having a frequency threshold above the frequency of mains interference and below the frequency of pulses in the waveform signal and indicative of movement created by the motor, and the low pass function having a frequency threshold above the frequency of the said pulses, whereby the pulses are passed by the filter means to be available for counting.

The pulses may be commutator pulses. The pulses may be injected into the motor current in dependence on the said movement.

The filter means may comprise separate high pass and low pass filter means. The low pass filter means preferably follows the high pass filter means.

The arrangement may further comprise amplifier means. The amplifier means is preferably operable to amplify the waveform signal prior to filtering by the filter means.

The frequency threshold of the low pass filter function is preferably above the highest frequency of pulses to be created by the motor.

The arrangement may further comprise counter means operable to count pulses passed by the filter means. The counter means may be provided by a processor device.

The invention also provides a method of monitoring DC motor current, in which a waveform signal representing the waveform of the motor current is created and is filtered by a high pass filter function and a low pass filter function, the high pass function having a frequency threshold above the frequency of mains interference and below the frequency of pulses in the waveform signal and indicative of movement caused by the motor, and the low pass function having a frequency threshold above the frequency of the said pulses, whereby the pulses are passed by the filter means to be available for counting.

The pulses may be commutator pulses. The pulses may be injected into the motor current in dependence on the said movement.

The high pass and low pass filter functions may be applied separately, preferably with the low pass filter function following the high pass filter function.

Amplification may be applied, preferably to amplify the waveform signal prior to filtering.

The frequency threshold of the low pass function is preferably above the highest frequency of pulses in the DC motor current.

Pulses passed by the filter functions are preferably counted, such as by means of a processor device.

In a second aspect, the invention provides a monitoring arrangement for use with a DC motor, the arrangement comprising:

detecting means for detecting movement of an item driven by the motor, to produce a pulse train; and switch means operable to change state to cause current to be drawn from or to cease to be drawn from the motor supply, the state of the switch means being controlled by the pulse train in order to inject a pulse train into the motor supply.

The detecting means preferably comprises a sensor responsive to one or more features of the item to detect movement thereof. The detecting means may comprise a Hall Effect sensor responsive to the movement of one or more magnets carried by the item. The item may be rotatable, to cause the or each feature to repeatedly pass the sensor. The detecting means may further comprise an oscillator operable to provide an oscillating output only when enabled by the sensor. The sensor may enable the oscillator when passing of the feature is detected.

The arrangement may include a second monitoring arrangement remote from the first monitoring arrangement and operable to detect a pulse train carried on the motor supply, whereby communication between the monitoring arrangements may be solely by means of the motor supply. The second monitoring arrangement may be a monitoring arrangement in accordance with the first aspect of the invention.

In a third aspect, the invention provides an aperture closure member control arrangement, comprising:

pulse means operable to create a train of pulses as the closure member moves;

counter means operable to count pulses of the train;

control means operable to determine the position of the closure member from the pulse count and to provide an output for modifying the manner in which the closure member is driven, in accordance with the predetermined position;

wherein the control means determines at least one speed change position and a reversing position and causes, in use, the speed of the closure member to change as the closure member passes the speed change position in at least one direction, and causes, in use, the response to an obstruction to change as the closure member passes the reversing position in at least one direction.

The pulse train may be created by a sensor responsive to one or more features of an item driven by a drive means which drives the closure member. The pulse train may be created by commutation of a DC motor used to drive the closure member.

The counter means preferably counts pulses created by different means at different positions of the closure member. The choice of pulses to be counted is preferably changed as the closure member passes the speed change position.

Preferably the pulses are provided to the counter means by an arrangement in accordance with the first or second aspect of the invention.

Preferably a speed change position is located near a fully open or fully closed position of the closure member, and the closure member is caused, in use, to slow down as the closure member passes the speed change position in the direction of the fully open or fully closed position. Speed change positions may be located near a fully open and near a fully closed position.

The reversing position is preferably located near the fully closed position of the closure member, and the closure member is caused, in use, to re-open when obstructed while closing, unless the closure member is between the reversing position and the fully closed position. The closure member may be caused, in use, to stop when obstructed while closing, if the closure member is between the reversing position and the fully closed position.

The reversing position is preferably between the fully closed position and the or the corresponding speed change position.

The invention also provides a method of controlling an aperture closure member, in which a train of pulses is created as the closure member moves, pulses of the train are counted and the pulse count is used to determine the position of the closure member and to modify the manner in which the closure member is driven, in accordance with the determined position, wherein at least one speed change position and a reversing position are defined, and the speed of the closure member changes as the closure member passes the speed change position in at least one direction, and the response to an obstruction changes as the closure member passes the reversing position in at least one direction.

The pulse train may be created by a sensor responsive to one or more features of an item driven by a drive means which drives the closure member. The pulse train may be created by commutation of a DC motor used to drive the closure member. The pulse count may be derived from pulses created by different means at different positions of the closure member. Preferably the choice of pulses to be counted is changed as the closure member passes the speed change position.

Preferably the train of pulses is created in accordance with the method of the first aspect of the invention.

Preferably the closure member is slowed down as the closure member passes the speed change position in the direction of the fully open or fully closed position. There may be speed change positions located near a fully open and near a fully closed position.

The closure member is preferably caused to re-open when obstructed while closing, unless the closure member is between the reversing position and the fully closed position. The closure member is preferably caused to stop when obstructed while closing, when the closure member is between the reversing position and the fully closed position.

Preferably the reversing position is between the fully closed position and the or the corresponding speed change position.

Embodiments of the present invention, and their manner of operation, will now be described in more detail, by way of example only, and with reference to the accompanying drawings, in which.

Figure 1:
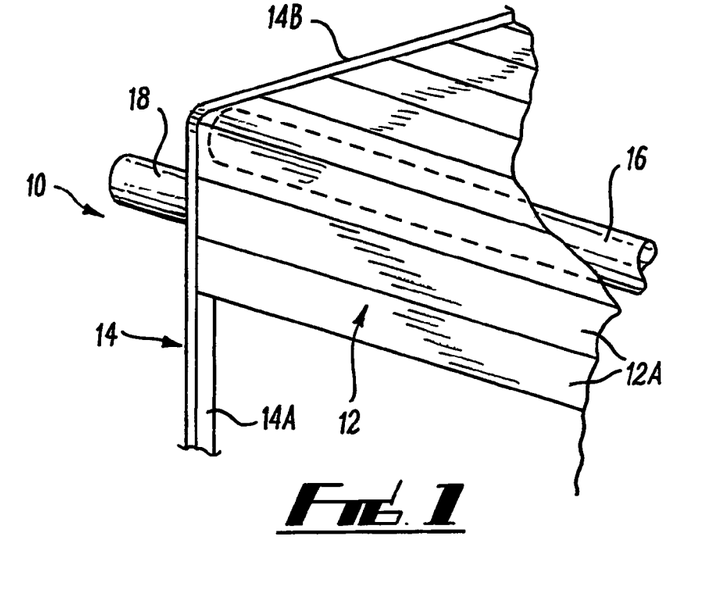
FIG. 1 is a highly schematic, part cut-away perspective view of an example of an aperture closure arrangement with which the present invention may be used.
Figure 1A:
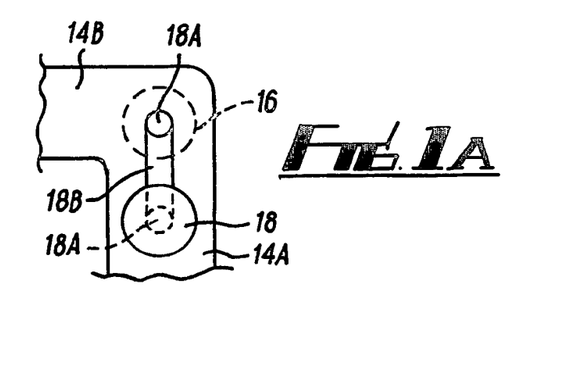
FIG. 1A is a simplified elevation view of part of the arrangement.

FIG. 1 illustrates an aperture closure member arrangement 10. A closure member in the form of a door 12 formed of articulated slats 12A is guided along a track 14, which has a generally vertical leg 14A and a generally horizontal leg 14B. Drive to the door 12 is provided by a shaft 16 which in turn is driven by a DC electric motor 18 through two pulley wheels 18A connected by a drive belt 18B, as shown schematically in FIG. 1A.

A similar track (not shown) is provided at the other side of the door 12. The tracks are installed with the vertical legs extending up either side of the aperture to be closed (such as an aperture in the outer wall of a building). The horizontal legs of the tracks extend back from the aperture, into the building. When the door 12 is closed, the slats 12A form a vertical barrier between the vertical legs of the tracks. To open the door, operation of the motor 18 and shaft 16 moves the door up to a horizontal position, supported by the horizontal legs of the tracks. The motor has a fast speed and a slow speed, the latter being used when the door is approaching the ends of its range of movement.

Figure 2:
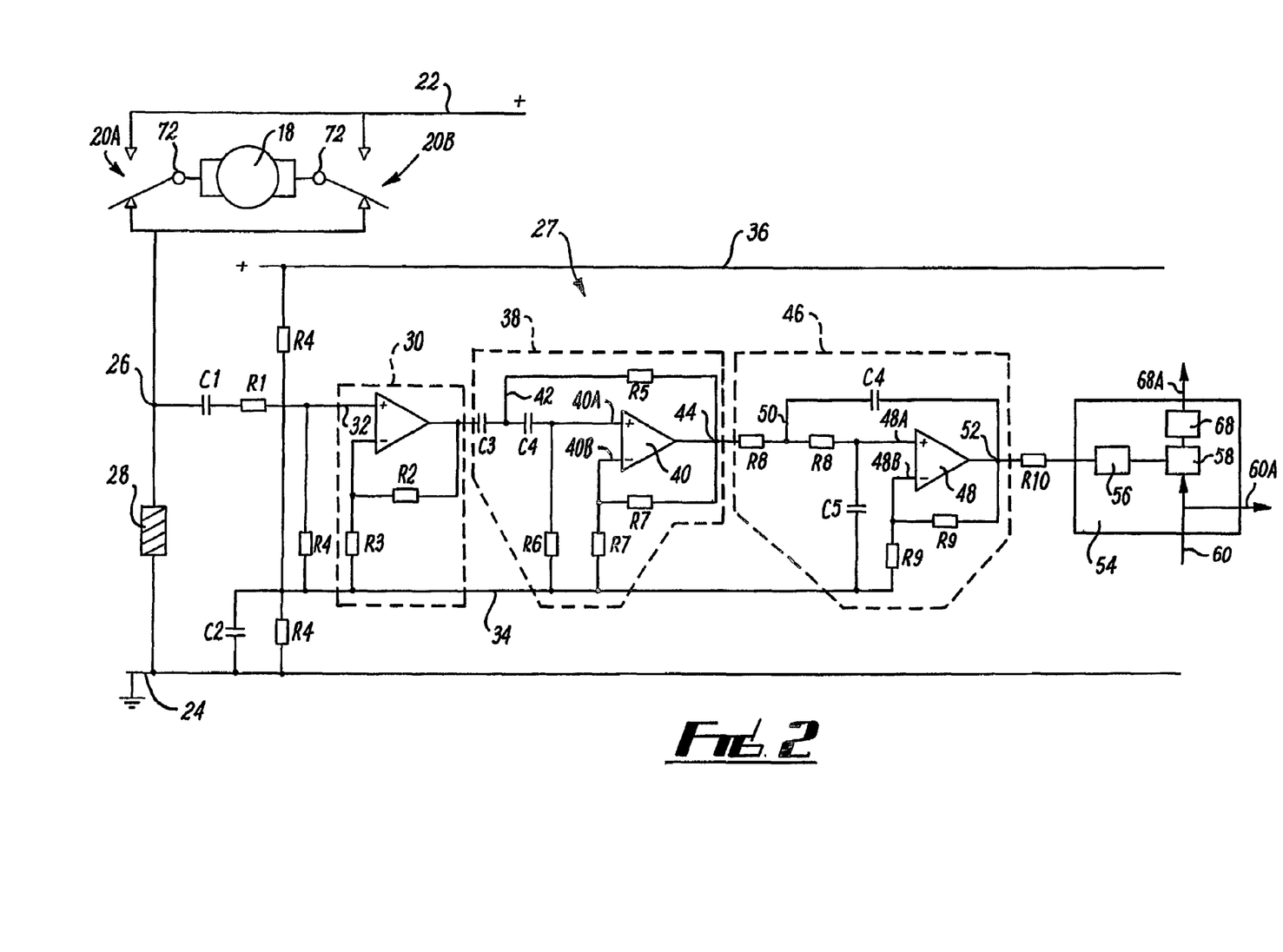
FIG. 2 is a circuit diagram of a current monitoring arrangement in accordance with the present invention.

The motor 18 is shown schematically in FIG. 2, which also shows a monitoring arrangement for monitoring the current supply to the motor 18.

The motor 18 is connected through relays 20A, 20B between a positive supply rail 22 and ground potential at 24. The relays 20A, 20B are shown in their de-energised condition. The motor 18 is disconnected from the rail 22 and inoperative. Energising one of the relays 20A, 20B will cause the corresponding side of the motor 18 to be connected to the rail 22, allowing DC current to pass through the motor 18, turning the motor. This, in turn, turns the shaft 16 and drives the door 12. The direction of the motor 18, and thus the direction of movement of the door 12 is determined by the choice of relay 20A, 20B, so that the motor 18 can be driven in either direction, according to this choice.

The motor 18 is a DC motor which may be conventional in itself. The motor 18 will have a commutator arrangement by means of which the current is switched between the coils of the motor, as the motor turns.

Figure 4:
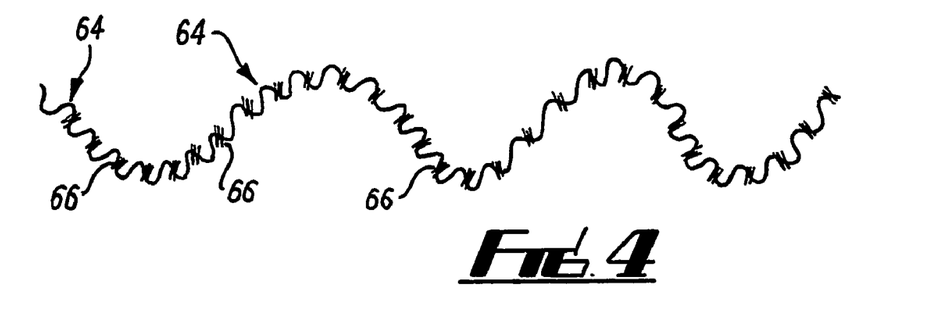
FIGS. 4 to 6 illustrate typical waveforms at various positions in the circuit of FIG. 2.

Motor current is sensed at 26 by means of a motor current sense resistor 28. This is in series with the motor 18 to create a voltage at 26 which varies as the motor current varies. FIG. 4 illustrates a typical voltage at 26, and will be described in more detail below.

The voltage from point 26 is applied to an amplifier 30 by means of a series capacitor C1 and resistor R1 connected to the non-inverting input 32 of the amplifier 30. Within the amplifier 30, a feedback arrangement is provided by resistors R2, R3 to provide an overall gain set by the ratio R2/R3.

The input 32 is biased by means of three resistors R4 and an associated capacitor C2 to provide an intermediate rail 34 at a voltage intermediate the voltage of the main supply rail 36 for the current monitoring arrangements 27.

The output of the amplifier 30 is applied to a high pass filter 38 which is of conventional design, based around an operational amplifier 40. Input from the amplifier 30 is applied to the non-inverting input of the amplifier 40 through series capacitors C3, C4. Feedback is applied at 42 through a resistor R5. Bias is applied to the non-inverting input by resistor R6 connecting that input to the intermediate rail 34.

Feedback to the inverting input 40B is provided from the common terminal of a voltage divider formed by series resistors R7 connected between the output of the filter 38, and the intermediate rail 34.

The output 44 of the high pass filter 38 is applied as the input of a low pass filter 46, based around a further operational amplifier 48. The low pass filter 46 is again conventional in itself, having series resistors R8 connected from the output 44 to the non-inverting input 48A, and feedback through a capacitor C4 to the point 50 between the resistors R8. The non-inverting input 48A is coupled to the intermediate rail 34 by a capacitor C5.

A voltage divider provided by resistors R9 is associated with the output 52 of the filter 46, the inverting input 48B and the intermediate rail 34, in a similar manner as the connections of the resistors R7 within the high pass filter 38.

The output 52 is connected through a series protection resistor R10 to an analogue input of a microcontroller 54. The microcontroller 54 is controlled by appropriate software. Within the microcontroller 54, an analogue-to-digital converter is provided at 56 to convert the waveform received from the filter 46 to a pulse train, which is counted by an up/down counter 58. The counter 58 is controlled to increment or decrement by an input 60 from an operator control (not shown). The input 60 indicates the required direction of movement. The input at 60 is also passed on, at 60A, to control the operation of selecting one of the relays 20A, 20B in order to determine the motor drive direction.

Figure 3:
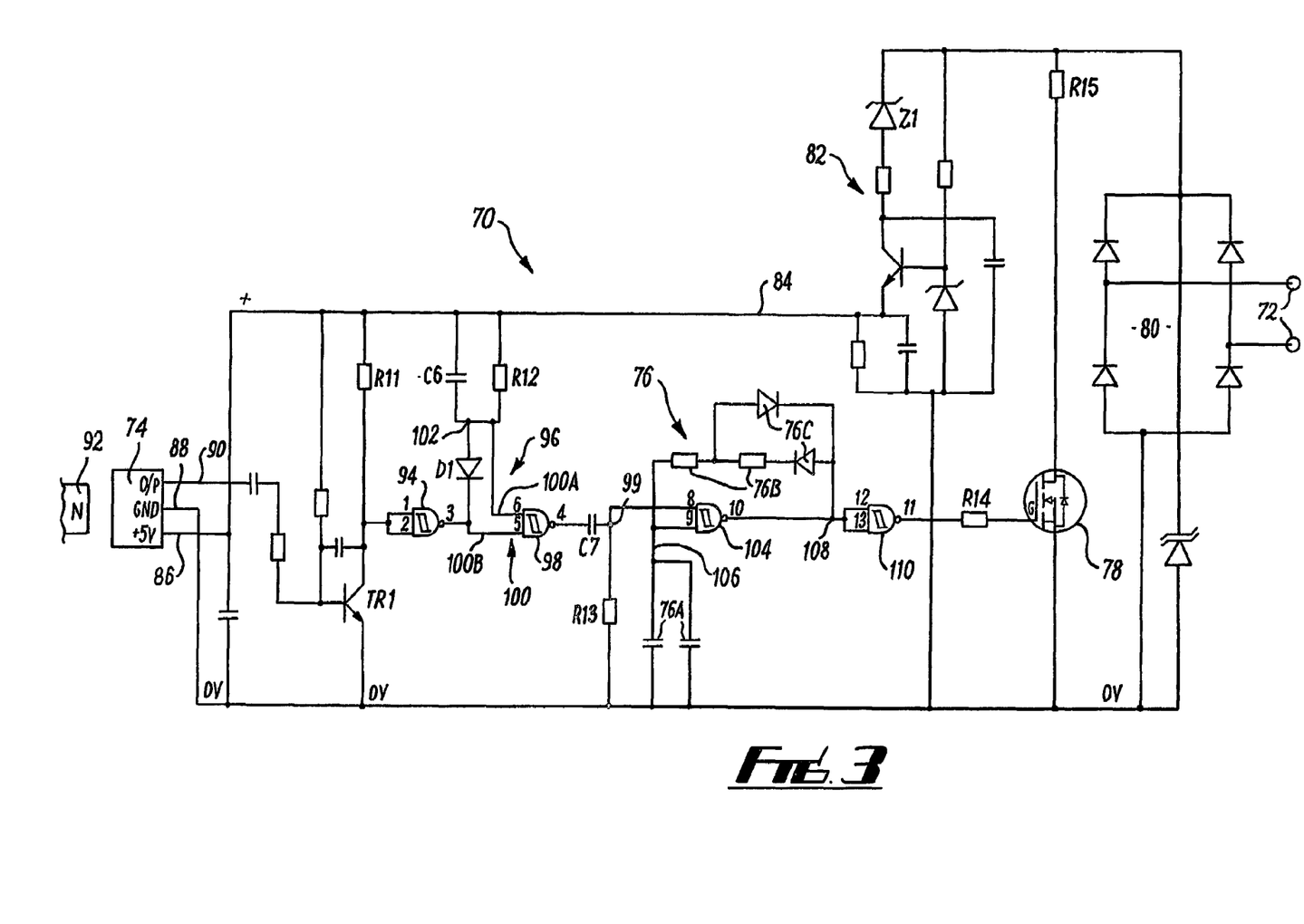
FIG. 3 is a circuit diagram of a pulse injector arrangement in accordance with the present invention.
Figure 5:
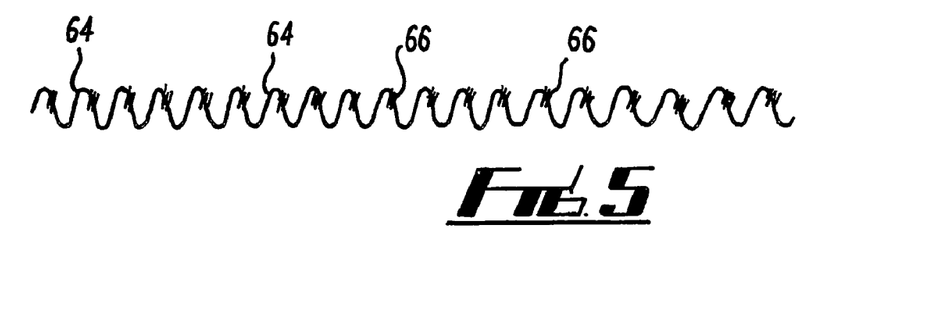
Figure 6:
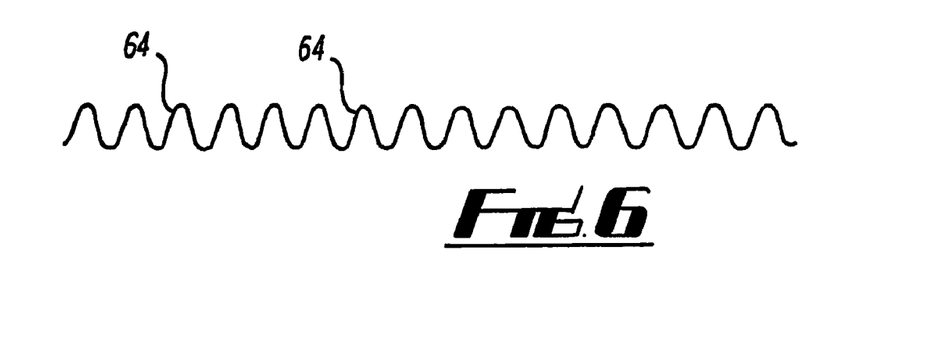

A further circuit, shown in FIG. 3, is associated with the motor 18 and will be described more fully below. The purpose of the circuit of FIG. 3 is to inject additional pulses into the current sensed by the resistor 28, for reasons which will also be described below. In order to obtain a clearer understanding of the invention, it is first appropriate to describe operation of the current monitor arrangement 27 in more detail, with reference to FIGS. 4 to 6, and in the absence of operation of the circuit of FIG. 3. FIGS. 4 to 6 show waveforms at various positions through the arrangement 27.

FIG. 4 illustrates an example of the voltage expected at 26, arising solely from the current through the motor 18. This exhibits an approximate sinusoidal form arising from the presence of relatively low frequency mains supply ripple. In the U.K., mains supply ripple will be at a frequency of 100 Hz. Pulses in motor drive current, caused each time the commutator switches, are also present. In FIG. 4, the commutator pulses 64 are illustrated at a frequency of about 1 kHz, which may correspond with fast operation of the motor 18. In slow operation mode, the commutator pulses may be at 400 Hz. Other frequencies for fast and slow operation may be chosen, particularly in the light of factors such as door weight etc.

The waveform is also found to exhibit short pulses of very high frequency noise 66, arising from commutator contacts arcing, bouncing or the like.

The waveform of FIG. 4 is first applied to the amplifier 30. The gain of this amplifier is set so that the final output at 52 swings across substantially the whole of the voltage range acceptable at the microcontroller 54 in order to provide good discrimination between cycles of the waveform, to improve the quality of the pulse train created by the A/D converter 56. The bias of the amplifier 30 causes the output 52 to be centred at the voltage of the intermediate rail 34.

The amplified waveform is applied to the high pass filter function provided at 38. The frequency threshold of the high pass filter function is chosen to be above the frequency of the mains supply ripple, but below the frequency of the commutator pulses 64. In this example, the frequency threshold would be between 100 Hz and 400 Hz. It will be understood by the skilled reader that a precise cut-off frequency will not be provided by a filter of the design shown in FIG. 2, but that the components can readily be selected in order to cause the filter 38 to reject mains supply ripple, resulting in an output at 44 as shown in FIG. 5, containing only the commutator pulses 64 and the noise 66. Mains supply ripple 62 has been removed.

The waveform of FIG. 5 is then applied to the low pass filter function provided at 46. This has a frequency threshold above the frequency of commutator pulses. Again, the threshold will not be a precise cut-off frequency, but in practice, as the noise 66 has a frequency which is very much higher than the frequency of pulses 64, the characteristics of the filter 46 can readily be selected to reject the noise 66, so that the output 52, applied by the filter 46 to the microcontroller 54, contains only the commutator pulses 64, having rejected the noise 66. The pulses, as they appear at 52 are shown in FIG. 6.

Thus, the arrangement 27 has recovered the commutator pulses 64 from the waveform at 26, rejecting the lower frequency, mains supply ripple, and the higher frequency noise 66. The waveform of FIG. 6 can then be used by the A/D converter 56 to create a pulse train for counting at 58.

The number of commutator pulses created by one revolution of the motor 18 is fixed by the design of the motor 18. The length of travel of the door 12 for each rotation of the motor 18 is fixed by the gear ratio of the drive train. Consequently, counting commutator pulses of FIG. 5 provides an accurate and precise measurement of the position of the door 12. For example, a practical example may give rise to in excess of fifty commutator pulses per 1 cm of door travel.

However, this analysis assumes that no slippage occurs between the pulley wheels 18A and drive belt 18B. If any slippage occurs, the motor 18 may continue to turn without the door 12 moving the corresponding distance, resulting in an inaccuracy in the commutator pulse count. Any such inaccuracy is unlikely to be significant, in practice, if it occurs over a small part of the range of movement, but may become significant if errors accumulate over a large part of the range of movement. The circuit of FIG. 3 seeks to address this issue.

The circuit 70 of FIG. 3 is connected at 72 across the motor 18 (the terminals 72 being illustrated in FIGS. 2 and 3). The purpose of the circuit 70 is to inject pulses into the motor current supply, through the terminals 72, for detection by the circuit 27 of FIG. 2.

In broad outline, the circuit 70 includes a Hall Effect sensor 74 which controls an oscillator 76 to produce a pulse train consisting of bursts of high frequency oscillation. These pulses are used to control the state of a transistor 78 to cause current to be drawn or not drawn from the connections 72, thus injecting current pulses into the motor current supply sensed at 28. This allows information to be sent from the sensor 74 to the circuit of FIG. 2 without requiring additional wiring connecting the circuits of FIGS. 2 and 3.

In more detail, the circuit 70 has a bridge rectifier 80 drawing power from the terminals 72 for a power supply at 82 which provides a positive supply rail 84.

The positive supply 84 is provided to the Hall Effect sensor 74 at 86. The sensor 74 is also connected to the ground rail at 88 and provides an output at 90. The Hall Effect sensor 74 is conventional in itself and provides an output 90 at a voltage mid-way between the rails 84, 88 in the absence of a magnetic field in the vicinity of the sensor 74. However, in the event that a north magnetic pole 92 of sufficient strength faces the sensor 74, the output 90 will drop towards the level of the rail 88.

The magnet 92 is mounted on the pulley wheel 18A (not shown in FIG. 3) which is fixed to the shaft 16, so that as the pulley wheel 18 rotates with the shaft 16, the magnet 92 repeatedly passes the sensor 74. Since the pulley wheel is fixed to turn with the shaft, this process is not affected by any slippage between the pulley wheel and the drive belt 18B.

The output 90 of the sensor 74 is applied to the base of a transistor TR1 having a collector resistor R11 connected to the positive rail 84, to form an inverter. A second inverter 94 provides an output applied to a pulse shaping circuit 96. By virtue of the double inversion, the output of the inverter 94 is high in the absence of a magnet, and drops low as the magnet 92 passes the sensor 74.

Within the circuit 96, a NAND gate 98 has two inputs 100. Input 100A is connected directly to the common terminal of a parallel capacitor C6 and resistor R12, the other terminals of which are connected to the positive rail 84. The input 100B is connected to the output of the inverter 94 and, through a diode D1 to the common terminal 102 of the capacitor C6 and resistor R12.

Consequently, in the absence of a magnet 92, the common terminal 102 will be high, both inputs 100A, 100B will be high and the output of the gate 98 will be low.

When a magnet 92 passes the sensor 74, the output of the inverter 94 falls. This sends the output of the gate 98 high but also pulls the common terminal 102 low. The common terminal 102 is then held low by the capacitor C6 for a period set by the time constant of capacitor C6 and resistor R12, so that the output of the gate 98 will remain high for this period, even if the output of the inverter 94 goes high during this period. In this example, the period is set at about 100 ms.

Thus, the output of the gate 98 goes high for a period of about 100 ms, each time the magnet 92 passes the sensor 74.

The output of the gate 98 is used to control the oscillator 76. The oscillator 76 is a gated free-running pulse generator. The mark-space ratio of the output is controlled by the resistive-capacitive time constant provided by frequency control capacitors 76A and resistors 76B and by the biasing of diodes 76C. Operation of the oscillator 76 will be apparent to the skilled reader. For the purpose of this description, it is sufficient to point out that the output of the oscillator 76 is from a gate 104 which is in turn controlled by the output of the gate 98. The output of the gate 98 is applied by means of a series RC time constant circuit C7, R13. Capacitor C7 initially pulls the common terminal 99 high, with the output of the gate 98. The voltage at 99 then decays with a time constant, in this example, of about 12 ms. Thus, each time a magnet passes the sensor 74, the output of gate 98 goes high for about 100 ms and a burst of oscillations, lasting about 12 ms, appears at the output 108 of the oscillator 76.

The frequency of oscillation is set by the component values within the oscillator 76 and in this example, is set at about 4 kHz.

Thus, each time a magnet 92 is sensed by the sensor 74, a 12 ms burst of 4 kHz oscillation is provided by the output 108 and applied through an inverter 110 and series resistor R14 to the gate of the transistor 78.

Each time a burst of 4 kHz oscillation is received at the base of the transistor 78, the transistor 78 will be switched (at 4 kHz) for a period of 12 ms. This causes current through the resistor R15 which is in series with the transistor 78 and across the bridge rectifier 80. Consequently, a 12 ms burst of 4 kHz current is drawn from the terminals 72 and thus injected onto the current waveform passing through the motor 18. The injected bursts of 4 kHz oscillation will therefore appear in the current which is sensed at the sensing resistor 28. They will be above the cut-off frequency of the high pass filter 38. The cut-off frequency of the low pass filter 46 is set to be above the oscillation frequency (such as at 6 kHz or above) so that the bursts of oscillation are passed to the microcontroller 54. This cut-off frequency is also above the frequency of commutator pulses when the motor is in a fast mode, but that is not important, because fast commutator pulses are ignored by the microcontroller 54.

The circuit of FIG. 3 operates only when the motor 18 is in fast operation, supplied by a relatively high voltage supply. When the voltage drops at 72 for slow speed operation, insufficient voltage arises for current to be drawn by the Zener diode Z1 of the power supply 82, and supply to the rail 84 ceases, shutting down the circuit 70.

Figure 7:
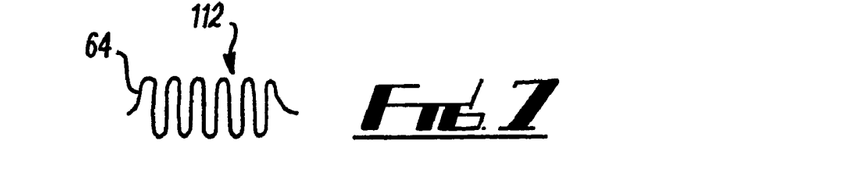
FIG. 7 illustrates part of the waveform of FIG. 6 on an enlarged scale when the pulse injector arrangement of FIG. 3 is operating.

FIG. 7 shows one cycle of the waveform of FIG. 6 on an enlarged scale, and showing a 12 ms burst 112 of 1 kHz oscillation, superimposed on a commutator pulse 64.

Consequently, the microcontroller 54 is provided with commutator pulses relating to rotation of the motor 18, and with high frequency bursts derived from rotation of the shaft 16, pulley 18A and magnet 92. This allows the microcontroller to choose which of these types of pulse to respond to, the significance of which can now be explained with reference to FIG. 6.

Figure 8:
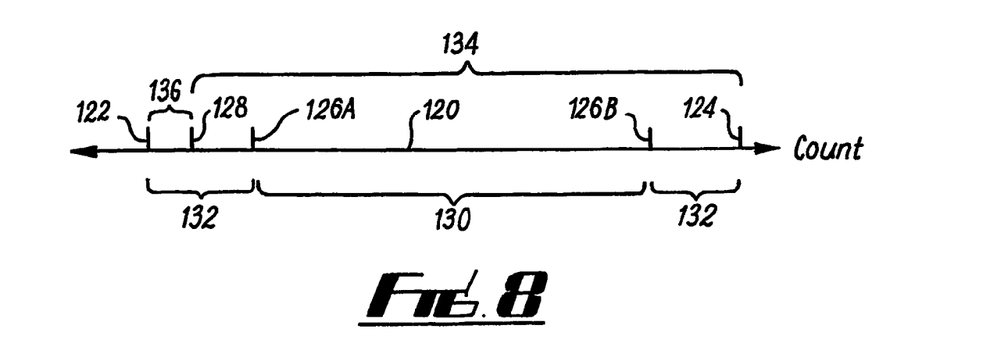
FIG. 8 schematically illustrates the control sequence which is implemented in accordance with the invention.

FIG. 8 shows a single axis 120 representing the count held by the counter 58. The count is derived in part from commutator pulses and in part from high frequency injected bursts. At one extreme of the count range, for example the lowest count, the count indicates the fully closed position at 122. At the other extreme count, for example the highest count, the count represents the full open position of the door, at 124. Other counts represent speed change positions 126A, 126B and a reversing position 128. Control functions 68, within the microcontroller 54, can readily identify the occurrence of a count which represents the positions 126A, 126B, 128 and issue an instruction at an output 68A to cause the speed of the closure member to change, or the response to an obstruction to change, as can now be described.

For example, counts within the region 130, between the speed change positions 126A, 126B represent the door at intermediate positions, i.e. away from its fully closed or fully open positions. Over this region of its movement, It is safe, in normal operating conditions, to move the door 12 at its faster speed, i.e. by driving the motor 18 at its fast speed. This corresponds with the production of fast (e.g. 1 kHz) commutator pulses 64 and the injection of 4 kHz bursts by the circuit 70. Over this region of its movement, counting 4 kHz bursts avoids any inaccuracy arising in the count from belt slippage, because rotations of the shaft 16 are being counted directly. However, the position measurement is coarse. For example, if only one magnet is used, the count represents complete turns of the shaft 16. As the door approaches the fully closed or fully open position, the count made by the microcontroller 54 will Indicate that the corresponding speed change position 126A, 126B has been reached. When this is detected by the arrangement 68, the output 68A is changed to reduce the motor 18 to its slower speed. This switches off the circuit 70, and commences slow (e.g. 400 Hz) commutator pulses 64. Commutator pulses then continue to occur, at a slower rate, but still retaining the relationship between pulse numbers and distance travelled, subject to slippage. However, the distance between the speed change position 126A, 126B can be set to be small (much smaller than the length of the mid region 130) so that slippage errors do not aggregate to an unacceptable degree. This function ensures that as the door 12 approaches its extreme positions, it is moving more slowly, so that any impact against end stops etc. is less severe, particularly if these have moved by mechanical misalignment or the like. Thus, this function of causing the speed of the closure member to change as the closure member passes the speed change position 126 is primarily provided for reasons of reliability, i.e. to reduce the risk of damage to the mechanisms when the extreme positions are reached.

In the region 132, between the fully open position and the corresponding speed change position 126B, it is appropriate to continue monitoring door position by counting commutator pulses. When the door stops moving, the count may be recalibrated, if any belt slippage has occurred.

Near the fully closed position, various additional safety features are Increasingly desired or required, sometimes by legislation. For example, it is desirable that if the door is obstructed, as it is nearly fully closed, it should stop and reverse to re-open. This ensures that, for example, a trapped limb is released rather than being injured.

The provision of this facility is assisted by the definition of a reversing position 128. If an obstruction is encountered while the door is closing, but in the region 134, between the reversing position 128 and the fully open position 124, the motor 18 is stopped and reversed in order to re-open the door. However, if the obstruction is sensed while the door is closing and is in the region 136, i.e. between the reversing position 128 and the fully closed position 122, the motor 18 is merely stopped, leaving the door at the position it has reached.

It is envisaged that the reversing position 128 can be set so that the gap then left by the door 12 is smaller than any body part likely to be within the gap, so that a body part would already have been encountered and the door re-opened, before reaching the reversing position 128. Thus, an obstruction between the reversing position 128 and the fully closed position 122 may be the result of mechanical misalignment, calibration error etc., rather than the presence of a body part, and thus does not require the door to be re-opened.

It can therefore be understood that the reversing position 128 can be set independently of the speed change position 126A, 126B, so that the separate requirements of mechanical reliability and safety can be addressed independently.

Furthermore, safety within the region 132 is enhanced by counting commutator pulses within this region, rather than high frequency bursts. This ensures that position measurement is much finer than in the mid region 130, there being many commutator pulses for each turn of the shaft 16.

Thus, in addition to making decisions about stopping or re-opening the door, in accordance with the position along the axis 120, the microcontroller 54 also makes decisions about the source of the signals to be counted. That is, the microcontroller 54 detects when the speed change position 126A is reached in either direction, and changes between counting commutator pulses or high frequency bursts, so that high frequency bursts are measured in the region 130, and commutator pulses are measured in other regions.

It is an important advantage of the arrangements described above that no wiring, in addition to the motor current supply, is required between the circuits of FIGS. 2 and 3 to allow them to communicate with each other. This simplifies installation.

Many variations and modifications can be made to the apparatus and methods described above, without departing from the scope of the invention. In particular, many different circuit arrangements could be envisaged, other than those shown in FIG. 2. Other divisions could be chosen between analogue and digital portions of the circuit. For example, filtering could be achieved by digital means. Band pass filtering could be used, rather than separate high pass and low pass filtering. The arrangements could be applied to other types of aperture closure members, such as sliding doors, roller shutters, vertical lift doors or high lift doors.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An aperture closure member control arrangement, comprising:
   (i) pulse means operable to create a train of pulses as the closure member moves;
   (ii) counter means operable to count pulses of the train; and
   (iii) control means operable in response to the pulse count to provide an output for modifying the manner in which the closure member is driven;
   wherein the control means determines:
   (i) a fully closed count corresponding with the fully closed position of the closure member;
   (ii) at least one speed change count, there being a nearest speed change count which is nearer to the fully closed count than any other speed change count is to the fully closed count; and
   (iii) a reversing count;
   and wherein the control means, in use, causes:
   (i) the speed of the closure member to change as the closure member passes the speed change count in at least one direction; and
   (ii) the response to an obstruction to change as the closure member passes the reversing count in at least one direction,
   and wherein the reversing count is between the fully closed count and said nearest speed change count.

2. The arrangement of claim 1, wherein the pulse train is created, in use, by a sensor responsive to one or more features of an item driven by a drive means which drives the closure member.

3. The arrangement of claim 1, wherein the pulse train is created, in use, by commutation of a DC motor used to drive the closure member.

4. The arrangement of claim 1, wherein the counter means, in use, counts pulses created by different means at different positions of the closure member.

5. The arrangement of claim 4, wherein the choice of pulses to be counted is changed as the closure member passes the speed change count.

6. The arrangement of claim 1, wherein there is a speed change count near a fully open or fully closed count of the closure member, and the closure member is caused, in use, to slow down as the pulse count passes the speed change count in the direction of the fully open or fully closed position.

7. The arrangement of claim 6, wherein speed change counts are located near a fully open count and near a fully closed count.

8. The arrangement of claim 1, wherein the reversing count is located near the fully closed count of the closure member, and the closure member is caused, in use, to reopen when obstructed while closing, unless the pulse count is between the reversing count and the fully closed count.

9. The arrangement of claim 8, wherein the closure member is caused, in use, to stop when obstructed while closing, if the pulse count is between the reversing count and the fully closed count.

10. A method of controlling an aperture closure member, in which a train of pulses is created as the closure member moves, pulses of the train are counted and the manner in which the closure member is driven is modified in response to the pulse count, wherein a fully closed count, at least one speed change count and a reversing count are and wherein a nearest speed change count is defined which is nearer to the fully closed count than any other speed change count is to the fully closed count, and wherein the speed of the closure member changes as the closure member passes the speed change count in at least one direction, and the response to an obstruction changes as the closure member passes the reversing count in at least one direction, and wherein the reversing count is between the fully closed count and said nearest speed change count.

11. The method of claim 10, wherein the pulse train is created, in use, by a sensor responsive to one or more features of an item driven by a drive means which drives the closure member.

12. The method of claim 10, wherein the pulse train is created by commutation of a DC motor used to drive the closure member.

13. The method of claim 10, wherein the pulse count is derived from pulses created by different means at different positions of the closure member.

14. The method of claim 10, wherein the choice of pulses to be counted is changed as the pulse count passes the speed change count.

15. The method of claim 10, wherein the closure member is slowed down as the pulse count passes the speed change count in the direction of the fully open or fully closed position.

16. The method of claim 15, wherein speed change positions are located near a fully open and near a fully closed position.

17. The method of claim 10, wherein the closure member is caused, in use, to re-open when obstructed while closing, unless the pulse count is between the reversing count and the fully closed count.

18. The method of claim 10, wherein the closure member is caused, in use, to stop when obstructed while closing, when the pulse count is between the reversing count and the fully closed count.

* * * * *